H. A. COVEY.
EGG AND CREAM WHIPPER.
APPLICATION FILED DEC. 29, 1913.
1,108,973.
Patented Sept. 1, 1914.
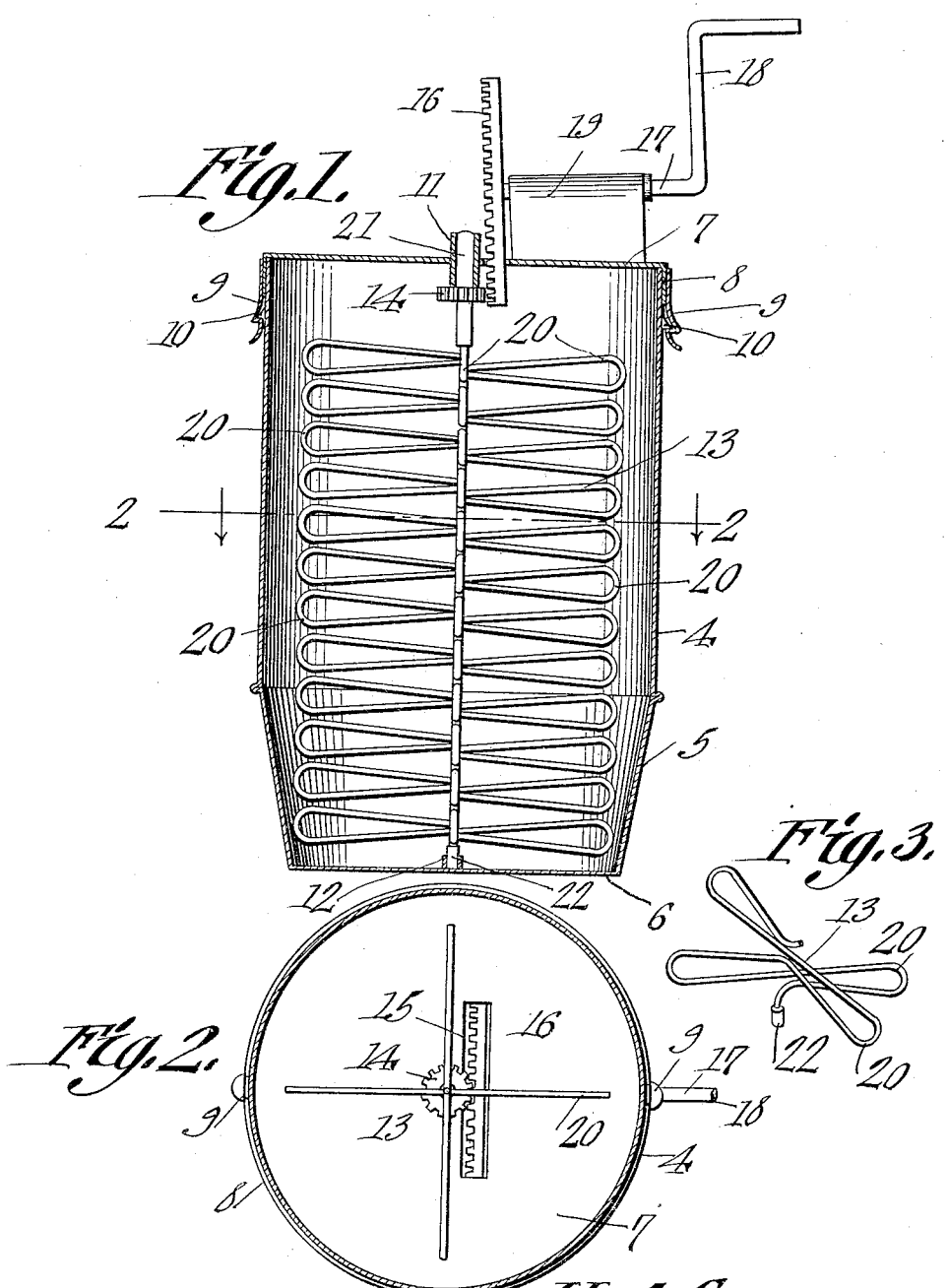
Witnesses
J. R. Tomlin
T. Willard
H. A. Covey
Inventor
by C. A. Snow & Co.
Attorneys

UNITED STATES PATENT OFFICE.

HARRY A. COVEY, OF AKRON, OHIO.

EGG AND CREAM WHIPPER.

1,108,973.  Specification of Letters Patent.  Patented Sept. 1, 1914.

Application filed December 29, 1913. Serial No. 809,331.

*To all whom it may concern:*

Be it known that I, HARRY A. COVEY, a citizen of the United States, residing at Akron, in the county of Summit and State of Ohio, have invented a new and useful Egg and Cream Whipper, of which the following is a specification.

This invention relates to improvements in a whipping or beating machine.

An object of the present invention is to provide a whipping machine which will be easy to clean and easily maintained in a clean condition.

A further object is to provide a machine of the class named in which the revolving beater is removably and detachably held in place and is not connected to the lid or to the containing vessel so that the lid and its actuating handle and gear may be removed independently of the rotating beater.

A further object is to provide a containing vessel with a beveled or tapering lower portion so that the outlying portions of the rotating beater will approach closely to the side walls of the vessel.

A further object is to provide a resilient rotating beater which will extend above the top of the containing vessel when the cover is removed, allowing for the end of the beater to be placed in its bearing prior to the attachment of the lid to the containing vessel thus facilitating the assembling of the parts.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a sectional view in elevation of my improved whipping machine. Fig. 2 is a sectional view taken on the line 2—2 of Fig. 1, and looking in the direction of the arrows. Fig. 3 is a view in perspective of a portion of the beater and disclosing the manner in which the coils are formed.

Referring to the drawings in which similar reference numerals designate corresponding parts throughout the several views, 4 designates a cylindrical containing vessel and which is provided at its lower portion with the frusto-conical extremity 5 across which extends the closing bottom 6. The seam between the main body portion 4 of the containing vessel and the frusto-conical extremity is formed externally thereof so that the interior will present a smooth and unbroken surface providing for the ready cleansing thereof.

The lid 7 is provided with the overhanging rim 8 which extends down over the side walls of the containing vessel and is provided with the diametrically opposed latches 9 which coact with the outstanding lugs 10 carried by the vessel 4, by means of which the lid may be securely locked in position upon the vessel. The lid is provided with the tube-like bearing 11 extending centrally therethrough and which projects above and below the lid and is disposed substantially in alinement with the bearing 12 which is carried by and positioned central of the bottom 6. Fitting between and rotatably mounted within the bearings 11 and 12 is the rotating beater 13 which is provided at its upper portion with the gear 14 and which gear contacts with the lower extremity of the tube-like bearing 11 and holds the lower extremity of the beater in position in the bearing 12.

The lid 7 is provided with the slot 15 which extends parallel to a diametric line and through which extends a gear 16. The gear 16 is supported by a shaft 17, the outer extremity of which is bent in the form of a handle as at 18. The shaft 17 is rotatably supported by the bearing 19 which is rigidly secured to and carried by the lid 7. The shaft 17 is disposed at an angle to the lid 7 so that the gear 16 will also be disposed at an angle to the axis of the rotating beater which will provide for a ready and quick engagement between the teeth of the gears 14 and 16. Thus when the lid is brought down upon the vessel with the rotating beater properly positioned in the bearing, the gear 14 will contact and slide into mesh with the gear 16, and thus provide for the positive and forced rotation thereof by the manual operating of the handle 18. The proper gear ratio between the gears 16 and 14 is provided and may be varied according to the class of service in which the beater is to be employed.

The rotating beater 13 is formed of resilient wires and is bent into a plurality of outstanding coils 20 so that the entire beater will be longitudinally expansible and compressible. This desirable feature provides that when the lid is removed, the beater will expand in a longitudinal direction and will force the end 21 thereof which acts in the capacity of a stub shaft, above and beyond the top of the vessel 4 so that it will engage the tube-like bearing 11 prior to the fitting of the lid upon the vessel which provides for the easy assemblage of the parts. When the lid is positioned upon the vessel with the trunnion 21 located within the bearing 11, the tube-like bearing will contact with the gear 14 and tend to compress the entire beater which will hold the lower trunnion 22 thereof securely and at the same time rotatably within the lower bearing 12.

The disposing of the gear 14 within the vessel thus allows the lid with the gear 16 to be removed independent of the rotating beater so that the lid may be independently cleaned and replaced. The same remarks apply to the beater provided that the lid has been first removed and which thus allows the three separate parts to be independently cleaned and thus rendering the device easy to clean and maintain in such condition. The lower frusto-conical portion 5 of the vessel is of importance when a certain class of material is being whipped as the loops extend adjacent the side walls of this portion and provide for the beating and treating of such material as may be disposed within said lower portion.

Having thus described my invention, what I claim is:—

1. A beater comprising a plurality of coils including outstanding loops and with the upper and lower extremities thereof bent into longitudinal alinement and forming trunnions for the rotatable mounting of the beater, the said beater being longitudinally expansible and contractible.

2. A beater comprising a plurality of superimposed distichous coils connected at their inner extremities, each coil narrowing or tapering toward the inner extremity which is the axis of the beater, said beater being longitudinally expansible and contractible and of substantially constant width throughout a large range of contraction and expansion.

3. A beater comprising a plurality of coils connected at their inner extremities, said beater being longitudinally expansible and contractible and of substantially constant width throughout a large range of contraction and expansion.

4. An apparatus of the class described, comprising a receptacle, a bearing carried by the bottom thereof, a detachable lid with a bearing therein, and a longitudinally expansible and contractible beater positioned within said receptacle engaging the bearings of the lid and bottom, the normal longitudinal length of said beater being relatively greater than the distance between said bearings, providing for the securement of the beater within the bearings prior to the engagement of the receptacle by the lid.

In testimony that I claim the foregoing as my own, I have hereto affixed my signature in the presence of two witnesses.

HARRY A. COVEY.

Witnesses:
  D. I. Elder,
  H. H. Stevenson.

---

Copies of this patent may be obtained for five cents each, by addressing the "Commissioner of Patents, Washington, D. C."